Figure 1:
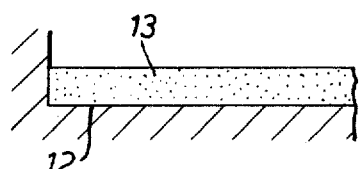
Figure 2:
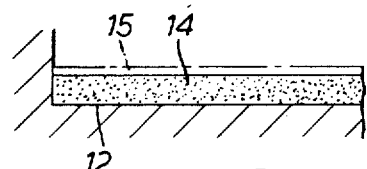
Figure 3:
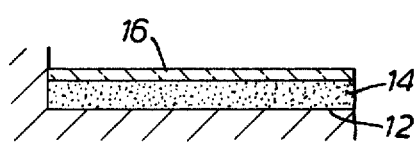

United States Patent [19]
Dyke et al.

[11] 3,882,215
[45] May 6, 1975

[54] METHODS OF MAKING BUILDING AND LIKE COMPONENTS

[75] Inventors: Edward Dyke, Sheffield; George Harold Farringdon, Wrenthorpe near Wakefield, both of England

[73] Assignee: FPA Fypol Limited, Sheffield, England

[22] Filed: June 23, 1972

[21] Appl. No.: 268,217

Related U.S. Application Data

[63] Continuation-in-part of Ser. No. 45,050, June 10, 1970, abandoned.

[52] U.S. Cl. ............... 264/113; 264/255; 264/308
[51] Int. Cl. .......................................... D04h 1/16
[58] Field of Search ............ 264/112, 113, 255, 308

[56] References Cited
UNITED STATES PATENTS

| | | | |
|---|---|---|---|
| 2,668,328 | 2/1954 | Porter | 264/255 |
| 2,769,742 | 11/1956 | Helbing | 264/255 |
| 3,171,772 | 3/1965 | Lomar et al. | 161/89 |
| 3,523,152 | 8/1970 | Curtis | 264/255 |

*Primary Examiner*—Robert F. White
*Assistant Examiner*—J. R. Hall
*Attorney, Agent, or Firm*—Olson, Trexler, Wolters, Bushnell & Fosse, Ltd.

[57] ABSTRACT

A method of molding a component by preparing a low viscosity mix of polyester resin and, adding a relatively coarse filler material, so that the filler material will settle on standing. A quantity of the mix is poured into a mould, allowed to settle into a lower, heavily filled, resin layer and an upper, filler-free, resin layer. Glass fibre reinforcement which is permeable to the upper layer and impervious to the lower layer is applied to the upper layer which, being filler-free, wets out and easily permeates the reinforcement. The required thickness of the component is built up by adding alternately further mix and further reinforcement.

8 Claims, 7 Drawing Figures

PATENTED MAY 6 1975          3,882,215

INVENTORS
Edward Dyke
George Harold Harringdon
By: Olson, Trexler, Wolters & Bushnell ATTORNEYS.

METHODS OF MAKING BUILDING AND LIKE COMPONENTS

REFERENCE TO RELATED APPLICATION

This application is a continuation-in-part application based upon our co-pending application Ser. No. 45,050 filed June 10, 1970, now abandoned.

This invention relates to the production of components from polyester resins. Examples of such components are building elements, such as building panels and shells, and preform sheets for shaping before curing into pipes and other articles.

Polyester resins, when purchased, usually include an amount of a monomer of a thermoplastic synthetic resin, such as styrene monomer or methyl methacrylate monomer. To cure the polyester resin, a catalyst and an accelerator are added to cause cross-linking of the polyester resin chains through the thermoplastic resin.

Polyester resins are also sold with powdered filler material incorporated. The filler material is inert to the polymerisation or curing reaction and serves to provide bulk, and thereby to reduce the price per unit volume of moulding. Whether the filler material is incorporated in the polyester resin mix as purchased, or is added separately by the user, the result is a high viscosity material in which the filler material is held in suspension.

In the making of polyester resin components using "unfilled" polyester resins without the incorporation of filler material, it is the practice to reinforce the components by adding one or more layers of a reinforcement which is pervious to the resin, a usual reinforcement being a chopped glass fibre mat. Each layer of reinforcement is forced down upon the top of the viscous polyester resin to cause the latter to wet out and permeate the reinforcement. Then further resin is added, a further layer of reinforcement applied and the process continued until the dimensions required of the moulding are achieved. Finally curing is effected, under the action of heat if necessary. Because of the high viscosity of the resin, even without filler, the proper impregnation of the reinforcement is a difficult and time-wasting operation and a danger exists of air pockets being trapped beneath the reinforcement with the results that bonding may be incomplete and delamination may occur.

The reinforcement of heavily filled polyester resins has not been practical. The presence of the filler material at the interface between the viscous polyester resin and the reinforcement prevents proper wetting of the reinforcement and penetration of the resin into and through the interstices of the reinforcement, with the result that, after curing, there is no adequate bond between the resin and the reinforcement, and delamination occurs. The formation of air pockets below the reinforcement is also prevalent. Accordingly, it has been possible to have components of unreinforced, filled polyester resin and components of reinforced, unfilled polyester resin, but not components of reinforced, filled polyester resin. The result has been that reinforced components, as required for building purposes, have been relatively highly priced, because several layers of reinforcement are required to obtain the necessary rigidity and strength.

In the present invention, the production of reinforced components from filled polyester resins is made possible by arranging that the polyester resin mix, including filler material, settles on standing into two layers: a lower layer containing substantially all of the filler material and an upper layer which is substantially free of filler material. This is achieved according to the present invention by having a mix of relatively low viscosity and using a relatively coarse filler material.

On settling, the upper layer has low viscosity, and can readily wet and permeate an applied reinforcing stratum of glass fibre which is impervious to the lower layer. Thus, not only is the resin properly bonded to the reinforcement on curing, but also the need for pressing the reinforcement into the resin mix, with the attendant loss of time, and the formation of air pockets are avoided; instead the reinforcement is placed into the substantially filler-free resin layer which has been formed on settlement and sinks under its own weight so that it becomes covered with a thin layer of the unfilled resin.

Two or more permeable reinforcing strata may be incorporated in a component. After each stratum has been applied, a further amount of the filled mix is added and again allowed to settle; the subsequent reinforcement is then, as before, added and is wetted out with filler-free resin.

Preferably, to achieve quick and efficient settling, the filler material should have a coarseness of up to 90 mesh, and the polyester resin should have a viscosity of 1 to 2 poises. The normal viscous polyester resin as purchased may have its viscosity decreased to the desired value by the addition of further styrene monomer, methyl methacrylate monomer, or other suitable thermoplastic resin monomer.

The preferred reinforcement is a chopped glass fibre mat i.e., an unwoven random assembly of lengths of glass fibre bonded together by a binder. On immersion in the resin, the binder is quickly dissolved.

The invention will be more readily understood by way of example from the following description of methods of making components from polyester resin reference being made to the accompanying drawing in which FIGS. 1 to 7 illustrate successive stages in the build-up of the component in a mould.

The first step in making the component is to prepare a low viscosity polyester resin mix including filler. A mix suitable for a standard building panel is as follows, the constituents being given by weight:

100 parts of general purpose unfilled polyester resin with premixed accelerator, as sold by Pinchin Johnson Paints (International Paint Company Limited) under their reference 55600.8016
10 to 20 parts of styrene monomer,
0.25 parts of dimethyl aniline (additional accelerator),
150 – 200 parts of organic or inorganic filler having a coarseness of up to 90 mesh
50 to 75 parts powdered filler (approximately 200 mesh)
1 part of methyl ethyl ketone peroxide catalyst.

A typical specific example of the mix has the following constituents:

1 lb. of the before-mentioned unfilled polyester resin with premixed accelerator,
1½ to 3 oz. styrene monomer, 1 cc full strength dimethyl aniline accelerator,
½ – ¾ lbs. powdered aluminium hydrate or silica flour
1½ – 2 lbs. 90 mesh white silica sand as filler,
6 cc methyl ethyl ketone peroxide.

The constituents are added in the order given; the polyester resin as sold has a viscosity of 4 to 5 poises which was decreased to a viscosity of 1 to 2 poises by the addition of the monomer.

The mix is thoroughly stirred into a homogeneous liquid in which the coarse filler is retained temporarily in suspension by the presence of the powdered filler (aluminium hydrate or silica flour). A quantity of the mix is then poured into a mold 12 and spread evenly over the surface to form a layer 13; the amount of this layer 13 is about 1 lb. per square foot of mold area. The coarse filler being retained in suspension up to and during pouring, the mix has a uniform composition over the area of the mold.

The mix rapidly separates into a lower layer 14 (FIG. 2) containing almost all of the coarse filler, and an upper layer 15 consisting almost entirely of polyester resin and without any coarse filler, and with some of the powdered filler.

A reinforcing stratum 16 (FIG. 3) consisting of a chopped glass fibre mat having a weight of 1 oz. per sq. foot is next laid on top of the mix, coming in contact with the low viscosity layer 15 of filler-free resin. A chopped glass mat is frequently used in reinforced resin bodies and consists of unwoven, randomly arranged, lengths of glass fibre temporarily held together by a binder. The mat is pervious to the relatively filler-free upper layer of the mix but is impervious to the heavily filled lower layer. The binder is rapidly dissolved in the resin. The glass mat rapidly sinks into the upper layer of the mix, the unfilled resin permeating the glass mat and fully wetting out the mat, leaving an exposed resin rich face; the presence of minor quantities of the powdered filler does not hinder the wetting action. The mat comes to rest above the heavily filled lower layer of the mix. Any air trapped below the mat readily escapes through the low viscosity resin layer and through the mat.

The settlement of the mix into the two layers was fully completed before the application of the reinforcing stratum and little, if any, settlement takes place subsequently. The upper layer of substantially filler-free resin is such that that resin is almost completely absorbed in the glass fibre mat, only a thin film of resin appearing above the wetted mat.

Figure 4:
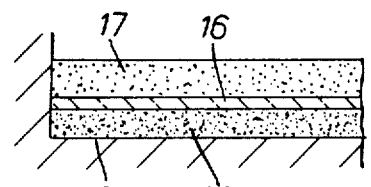
Figure 5:
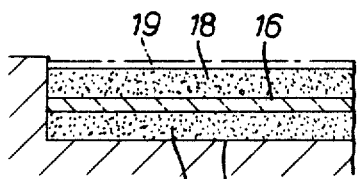
Figure 6:
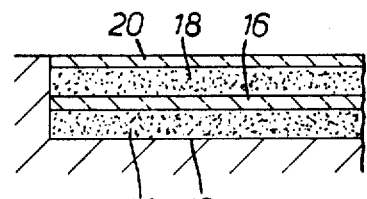

Next, a further quantity (2 lbs. per sq. foot) of the mix is poured into the mold to form a further layer 17 (FIG. 4). The second quantity of the mix settles as before into a lower heavily filled layer 18, which sinks through any resin remaining above the mat 16 and ends up on top of the mat 16, and an upper unfilled resin layer 19 (FIG. 5). A second layer 20 (FIG. 6) of glass mat is applied and becomes rapidly impregnated with unfilled resin; this second layer 20 may be heavier than the first layer 16 and have a weight of 1½ oz. per sq. foot.

Figure 7:
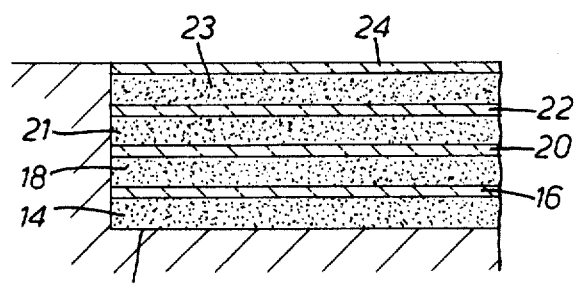

The thickness of the component may be built up in this way to the required value; thus FIG. 7 shows an element having four strata of chopped glass fibre mat reinforcement 16, 20, 22, 24. Each reinforcement stratum is as before fully impregnated with unfilled resin which also wets the upper and lower surfaces; but, between successive reinforcement strata and their surrounding film coatings of unfilled resin there are layers 14, 18, 21, 23 of heavily filled resin. In other words, a sandwich construction is formed with successive layers of heavily filled resin separated by the strata of glass fibre mat fully impregnated with resin that is devoid of coarse filler. As each layer of filler-free resin is almost entirely absorbed in the subsequent glass fibre mat, little resin appears above the final reinforcing stratum.

As the strata of glass fibre mat are properly impregnated with resin mix that is substantially free of the coarse filler, when subsequent curing occurs, a satisfactory bond is produced between the mat and the bonded filler formed by the or each heavily filled layer of the mix in contact with the mat and the possibility of delaminating is avoided.

The component may be completed by a layer of thermal insulating material or of decorative or other finishing material. To produce a component with thermal insulating properties, a layer of, for example, rigid polyurethane foam sheet is applied after the last reinforcement layer is in place. The area of the foam sheet is slightly less than the area of the mould and the unfilled resin permeating the last reinforcing stratum wets the lower surface of the foam sheet and acts as a bonding agent for the sheet. A further quantity of the resin mix is poured over and around the foam sheet, so that, on curing, the foam sheet is encapsulated.

For a decorative or other finish, the finishing material, which may be pebble dash or clay brick slivers, is applied to the final surface of the moulding, the weight of the finishing material pressing on the final reinforcing mat and thus encouraging the permeation of the unfilled resin through that final mat to wet and key the finishing material to the rest of the moulding. The finishing material contributes stiffness to the final, cured, component and thus provides rigidity against warping.

When the moulding has been built up, the mould is left and the moulding allowed to cure at room temperature. Curing may be accelerated by subjecting the moulding to elevated temperatures. The result is a strong, low-cost building component, which has good laminate strength and which has no tendency to delaminate.

If a component having fire resisting properties is required, the polyester resin mix is alternatively made up as follows:

1 lb. of flame retardant polyester resin to British Standards specification No. 476 with premixed accelerator, as sold by Pinchin Johnson Paints under their reference 5561X0013 1½ to 3 oz. of styrene monomer, 3 – 5 oz. of dried hydrate of alumina as additional fire retardant, 1½ – 1¾ lbs. of 90 mesh white silica sand as filler, 6 cc. methyl ethyl ketone peroxide as catalyst. The constituents were added in the order given, the mix, prior to the addition of the filler, having a viscosity of 1 to 2 poises.

It should be noted that no additional accelerator is included but some dimethyl aniline may be added to increase the hardening rate. However, in any case, because of the presence of the flame retardant additives, both initially in the polyester resin and as a further constituent in the mix, the curing time will be greater than for the mix for a standard building panel.

The component is built up to the required thickness as previously described for a standard building component, chopped glass fibre mat reinforcement again being used.

To produce a component with stability at high temperatures, special "high heat distortion point" polyester resins may be used. To produce a component which has varying thicknesses over its area and which has therefore a tendency to crack on curing when using normal resins, a blend of iso-orthophalic polyester resins — mixed at the acid state — may be used to give a more flexible product in which the stresses during curing are relieved.

Other filler materials than those referred to already may be used to produce components having different characteristics. Thus very hard components can be produced by using molochite or various alumina silicates as the filler, but whatever the filler it is preferred not to exceed twice the weight of the polyester resin.

We claim:
1. A method of manufacturing a reinforced polyester resin-filled component, comprising:
   a. forming a mixture of a curable liquid polyester resin, a monomer of a thermoplastic synthetic resin, a catalyst for said polymer, and an inert particulate filler material, said filler particles being capable of settling in said liquid resin as a lower layer containing the major part of said filler particles and an upper layer containing a minor part of said filler particles,
   b. pouring a portion of said mixture into a mold for said component,
   c. allowing said filler particles to settle into said lower and upper layers,
   d. placing a first reinforcing stratum of glass fiber on said resin upper layer in which said stratum is permeable, is impregnated therewith, and is allowed to sink and rest upon said filler lower layer to which said stratum is impervious,
   e. pouring a second portion of said mixture as in step (a) into said mold over said first reinforcing stratum,
   f. allowing said filler particles in the second portion of said mixture to settle upon and without displacing said first-placed stratum to form upper and lower layers as in step (c),
   g. placing on said second portion upper layer a second reinforcing stratum of said glass fiber which sinks and rests upon said second portion lower layer of filler particles, and
   h. curing all portions of said polyester resin to produce a unified component thereof.

2. A method according to claim 1, in which said filler material comprises a major portion of a relatively course granular material of up to 90 mesh; and a minor portion of a smaller mesh material which remains in said upper layer of said mixture.

3. A method according to claim 1, in which said polyester resin, before addition of said filler material, has a viscosity of 1 to 2 poises.

4. A method according to claim 3, in which said mixture is given the required viscosity by the addition of further monomer.

5. A method according to claim 1, in which each of said stratum of glass fiber material is constituted by a glass fiber mat.

6. A method according to claim 1, including the further step of: superposing a layer of thermal insulating material on the last said glass fiber stratum introduced in said mold prior to said curing, whereby said layer of thermal insulating material is contacted with said resin mixture permeating said last stratum, and bonded thereto.

7. A method according to claim 6, in which said layer of thermal insulating material has dimensions slightly less than said mold whereby the sides are contacted with said permeated resin mixture.

8. A method according to claim 1, including the further step of: superposing a finishing particulate material on the last said glass fiber stratum introduced in said mold, said finishing particulate material being bonded to said glass fiber stratum.

* * * * *